(12) United States Patent
Tucker et al.

(10) Patent No.: US 11,299,127 B2
(45) Date of Patent: Apr. 12, 2022

(54) AUTHORIZED OPERATION OF VEHICLES

(71) Applicants: Jackie Tucker, Santa Cruz, CA (US); Andrew Lee Van Valer, Reno, NV (US)

(72) Inventors: Jackie Tucker, Santa Cruz, CA (US); Andrew Lee Van Valer, Reno, NV (US)

( * ) Notice: Subject to any disclaimer, the term of this patent is extended or adjusted under 35 U.S.C. 154(b) by 0 days.

(21) Appl. No.: 16/830,792

(22) Filed: Mar. 26, 2020

(65) Prior Publication Data

US 2021/0300298 A1 Sep. 30, 2021

(51) Int. Cl.
*B60R 25/30* (2013.01)
*B60R 25/20* (2013.01)

(52) U.S. Cl.
CPC ............ *B60R 25/30* (2013.01); *B60R 25/20* (2013.01); *B60R 25/2063* (2013.01); *B60R 2325/106* (2013.01)

(58) Field of Classification Search
CPC ..... B60R 25/30; B60R 25/20; B60R 25/2063; B60R 2325/106; B60R 25/00; B60R 25/01; B60R 25/04; B60R 2025/0415; B60R 25/045; B60R 25/209; B60R 25/23; B60R 25/25; B60R 25/252; B60R 25/34; B60R 25/2018; B60K 28/063; B60W 2040/0809; B60W 2040/0836; B60W 2040/0064; B60W 2040/0065; B60W 2040/0066; B60W 2040/0067; B60W 2540/043; B60W 2540/045; B60W 2540/06

USPC ............ 701/45, 112, 113; 123/179.1, 179.2, 123/179.3; 340/426.11, 426.12, 426.3
See application file for complete search history.

(56) References Cited

U.S. PATENT DOCUMENTS

| | | | | |
|---|---|---|---|---|
| 4,912,458 | A * | 3/1990 | Comeau | B60K 28/063 180/272 |
| 5,513,105 | A * | 4/1996 | Krones | B60R 25/04 180/287 |
| 5,552,642 | A * | 9/1996 | Dougherty | B60R 25/045 307/10.3 |
| 6,271,745 | B1 * | 8/2001 | Anzai | G07C 9/00563 340/5.53 |
| 2003/0142849 | A1 | 7/2003 | Lemelson et al. | |

(Continued)

*Primary Examiner* — Edwin C Holloway, III
(74) *Attorney, Agent, or Firm* — Donald R. Boys; Central Coast Patent Agency LLC

(57) ABSTRACT

A system for starting a vehicle has a first apparatus having a microprocessor, a first data repository, a normally open electrical imposed between positive vehicle battery voltage and a keyed ignition switch, and a second electronic apparatus comprising a second microprocessor executing second coded instructions from a non-transitory medium, the second microprocessor coupled with the first microprocessor, a second data repository coupled to the second microprocessor and storing a list of identities of drivers authorized to operate the vehicle, and an input mechanism enabling a candidate driver to identify to the second microprocessor. The candidate driver identifies to the second microprocessor by the input mechanism, the second microprocessor, executing the second coded instructions, determines if the driver identity matches an identity on the list drivers authorized to operate the vehicle, and if so, causes the first microprocessor to close the normally open contact.

14 Claims, 4 Drawing Sheets

(56) References Cited

U.S. PATENT DOCUMENTS

| | | | |
|---|---|---|---|
| 2005/0225429 A1* | 10/2005 | Burzio | B60R 25/04 340/5.24 |
| 2007/0001826 A1* | 1/2007 | Lanier | B60R 25/04 340/425.5 |
| 2013/0082820 A1* | 4/2013 | Tieman | G07C 9/00309 340/5.61 |
| 2013/0151111 A1* | 6/2013 | Skelton | B60R 16/02 701/99 |
| 2013/0206495 A1* | 8/2013 | Westbrook | B60K 28/063 180/272 |
| 2017/0120864 A1 | 5/2017 | Fischer et al. | |
| 2018/0262891 A1* | 9/2018 | Wu | G07C 9/00857 |

* cited by examiner

AUTHORIZED OPERATION OF VEHICLES

BACKGROUND OF THE INVENTION

1. Field of the Invention

The present invention is in the technical area of vehicle controls and pertains more particularly to a system for enabling specific persons to operate a particular vehicle.

2. Description of Related Art

It is well known that there are many circumstances wherein certain individuals should not operate motor vehicles. For example, a person known to have a serious drinking problem, and who may have had serial DUI arrests, should not drive, for that person's sake and for the sake of the general public. Certainly, a person inebriated or under influence of other mind-altering chemicals should not drive. The same is true for a person suffering from some serious level of dementia, or from some other physical disability that would make it dangerous for that person to drive. In families, an older person having lost the necessary vision, coordination, or attention to safely drive a vehicle should not be allowed to do so.

A variety of solutions have been implemented in the general area of who should not drive. In some circumstances, often predicated by a court order, a person who has a severe problem with alcohol may be required by order of a court to install a breathalyzer device which is integrated with ignition circuitry of the person's vehicle, to be able to activate the ignition to start the vehicle. But it is well known in the art that public and private efforts to prevent unsafe drivers from driving are often largely ineffectual. As a single example, a person required to have a breathalyzer device on his or her vehicle may simply rent, or even steal a vehicle, and still be a hazard on the public streets and roads.

It is known in the art of telematics to provide a dongle that plugs into the OBD port of a vehicle, and to communicate with the dongle through a cellular telephone app, via short-range wireless protocol, to both retrieve data from the vehicle's computer system and to operate some functions of the vehicle, such as rolling the windows down, for example.

So, a rather straight-forward way of preventing one person from operating the vehicle might be to disable the ignition in the presence of that person, or if that person attempts to operate the vehicle. This is what is done, for example, with the breathalyzer apparatus.

With experience with these sorts of systems it has become clear that there is often a difficulty with identification, among other problems. If the goal is to prevent a person who has a physical or mental issue that makes it unsafe for that person to operate a vehicle from operating a vehicle, for example, it is necessary that the apparatus in the vehicle recognize that person. And there may other problems with disabling the ignition, which may become disabled while the automobile is being driven on a busy freeway.

What is needed in the art is a system that enables a vehicle to be started and driven by a specific person qualified to operate the vehicle, rather than disabling the vehicle for a specific person who may not be competent to operate the vehicle.

BRIEF SUMMARY OF THE INVENTION

A system for enabling a user to start and operate a vehicle is provided, comprising a first electronic apparatus comprising a first microprocessor executing first coded instructions from a non-transitory medium, a first data repository coupled to the first microprocessor, and a normally open electrical contact controlled by the first microprocessor, the normally open electrical contact imposed between positive vehicle battery voltage and a keyed ignition switch of the vehicle, such that the vehicle cannot be started and operated with the normally open electrical contact open. There is a second electronic apparatus comprising a second microprocessor executing second coded instructions from a non-transitory medium, the second microprocessor coupled for communication with the first microprocessor, a second data repository coupled to the second microprocessor and storing a list of identities of drivers authorized to operate the vehicle, and an input mechanism enabling a candidate driver to identify to the second microprocessor. The candidate driver identifies to the second microprocessor by the input mechanism, the second microprocessor, executing the second coded instructions, determines if the driver identity matches an identity on the list of identities of drivers authorized to operate the vehicle, and if so, causes the first microprocessor to close the normally open contact, enabling the vehicle to be started and operated.

In one embodiment the first and the second microprocessors are in direct wired communication. Also, in one embodiment the input mechanism is an interactive interface displayed on a touchscreen. In one embodiment the first microprocessor senses when the keyed ignition switch is open or closed. And in one embodiment the system further comprises an electrical contact in the ignition circuit after the keyed ignition switch, connected back to the first microprocessor, enabling the first microprocessor to sense when the keyed ignition switch is open or closed.

In one embodiment the system further comprises wireless cellular circuitry enabled to connect the first microprocessor to a wide-area network through a wireless gateway. And in one embodiment the wide-area network is the well-known Internet network, further comprising an Internet connected server executing coded instructions providing an interactive interface enabling a user to edit the list of identities of drivers authorized to operate the vehicle, stored in the second data repository coupled to the second microprocessor.

In one embodiment a system for enabling a user to start and operate a vehicle is provided, comprising a first electronic apparatus having a first microprocessor executing first coded instructions from a non-transitory medium, a first data repository coupled to the first microprocessor, the data repository storing at least a unique vehicle identification number, a normally open electrical contact controlled by the first microprocessor, the normally open electrical contact imposed between positive vehicle battery voltage and a keyed ignition switch of the vehicle, such that the vehicle cannot be started and operated with the normally open electrical contact open, a first near-field wireless communication circuit. A mobile communication device enabled to operate on a cellular network as a part of the system has a second microprocessor executing a mobile application providing interactive interfaces on a touchscreen, a second data repository coupled to the second microprocessor and storing a list of identities of drivers authorized to operate individual ones of a plurality of vehicles, a second near-field wireless communication circuit, compatible with the first near-field wireless communication circuit, and an input mechanism enabling a candidate driver to identify to the second microprocessor. The mobile communication device pairs with the first electronic apparatus through the near-field communication circuits, the first microprocessor causes the vehicle identification code to be transmitted to the mobile communication device, the candidate driver identifies to the second microprocessor by the input mechanism, the mobile application determines if the driver identity matches an identity on the list of identities of drivers authorized to operate the vehicle identified by the vehicle identification number, and is so, the mobile application causes a code to be sent by the near-field communication circuit, causing the first microprocessor to close the normally open contact, enabling the vehicle to be started and operated.

In one embodiment the input mechanism is an interactive interface displayed on the touchscreen of the mobile communication device. Also, in one embodiment the first microprocessor senses when the keyed ignition switch is open or closed. Also, in one embodiment the system further comprises an electrical contact in the ignition circuit after the keyed ignition switch, connected back to the first microprocessor, enabling the first microprocessor to sense when the keyed ignition switch is open or closed. In one embodiment the system further comprises wireless cellular in the mobile communication device enabled to connect the first microprocessor to a wide-area network through a wireless gateway. And in one embodiment the wide-area network is the well-known Internet network, further comprising an Internet connected server executing coded instructions providing an interactive interface enabling a user to edit the list of identities of drivers authorized to operate the vehicle, stored in the second data repository coupled to the second microprocessor.

In another aspect of the invention a method for enabling operation of a vehicle is provided, comprising imposing a first electronic apparatus having a first microprocessor executing first coded instructions from a non-transitory medium, a first data repository coupled to the first microprocessor, the data repository storing at least a unique vehicle identification number, and a normally open electrical contact controlled by the first microprocessor between positive vehicle battery voltage and a keyed ignition switch of the vehicle, such that the vehicle cannot be started and operated with the normally open electrical contact open, identifying by a candidate driver through an input mechanism to a second microprocessor executing second coded instructions from a non-transitory medium, the second microprocessor coupled to a second data repository storing a list of identities of drivers authorized to operate the vehicle, determining by the second microprocessor if the driver identity matches an identity on the list of identities of drivers authorized to operate the vehicle, and if the driver identity matches an identity on the list of identities of drivers authorized to operate the vehicle sending a signal to the first microprocessor to close the normally open contact, enabling the vehicle to be started and operated.

And in one embodiment of the method the second microprocessor is connected to the first microprocessor and the signal is a digital code recognized and acted upon by the first microprocessor. Also, in one embodiment the input mechanism is presented on a touchscreen of the vehicle. In one embodiment the first electronic apparatus has a first near-field communication circuit, and the first data repository stores a vehicle identification code unique to the vehicle, and the second microprocessor is a part of a mobile communication device having a second near-field communication circuit, a touchscreen display and executes a mobile application, and wherein the mobile communication device pairs with the first electronic apparatus through the near-field communication circuits, the first microprocessor causes the vehicle identification code to be transmitted to the mobile communication device, the candidate driver identifies to the second microprocessor by the input mechanism, the mobile application determines if the driver identity matches an identity on the list of identities of drivers authorized to operate the vehicle identified by the vehicle identification number, and is so, the mobile application causes a code to be sent by the near-field communication circuit to the first microprocessor in the first electronic apparatus, causing the first microprocessor to close the normally open contact, enabling the vehicle to be started and operated.

DETAILED DESCRIPTION OF THE INVENTION

Figure 1:
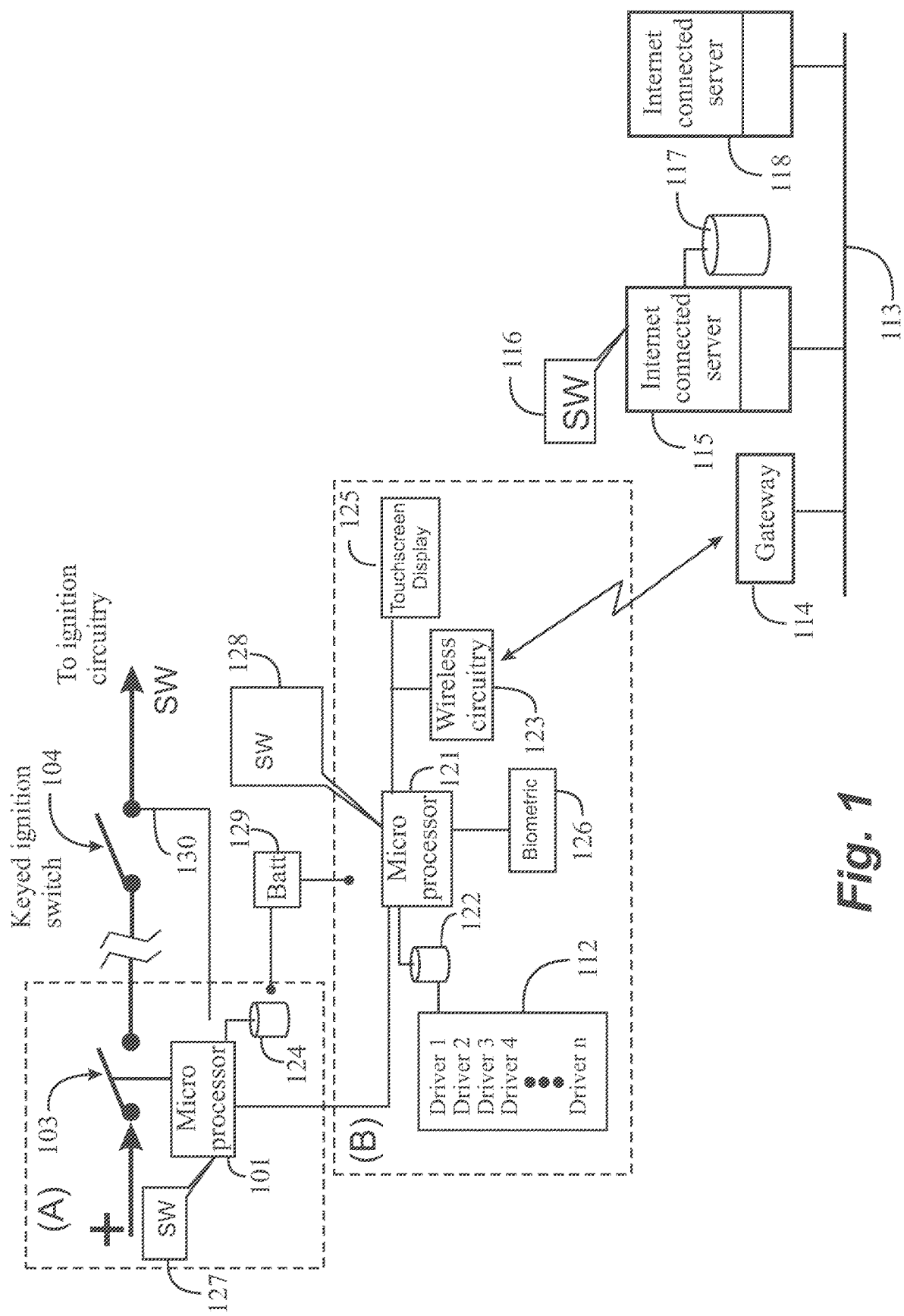
FIG. 1 is a diagram illustrating a system in one embodiment of the present invention.

After consideration of the difficulty of recognizing particular people and disabling the ignition of a vehicle for operation by those particular people, the present inventors decided that a far better approach might be to enable the ignition for specific people rather than disabling the ignition for a specific person. Some vehicles may be operated nearly always by just one specific person. But in that event, the principal operator of that vehicle may wish to be able to loan the vehicle to another for a limited time. There are also situations wherein an owner and operator of a vehicle may want to take advantage of, for example, a valet parking circumstance, wherein it will be necessary for a person other than the principle owner/operator to drive the vehicle. These sorts of circumstances will have to be accommodated in any system according to embodiments of this invention.

Most vehicles may be owned by, or registered to one particular person, but may not be exclusively operated by that person. It is, in fact, rather rare for any single vehicle to be operated exclusively by just one person. For example, in a family situation there may be more than one vehicle, and different vehicles may on occasion be shared. There may be two or more drivers of any particular vehicle over a period of time.

The inventors have spent considerable time discussing the requirements of a system that may operate by enabling a vehicle to be started and operated only by a person authorized to do so, but that will not start for a person not authorized to start or operate the vehicle. The inventors thus developed a preliminary specification for such a unique system, comprising a few specific apparatuses, as follows: (A) Apparatus (A) comprises computerized apparatus integrated with other circuitry of a subject vehicle, such as ignition circuitry, the apparatus capable of preventing the vehicle from being started or operated by anyone, unless the candidate driver may be recognized as an authorized driver by the computerized apparatus in the vehicle. Ignition circuitry is common to vehicles powered by internal combustion power plants, but electrically powered vehicles typically also have an Off/On switch to enable the vehicle to be operated.

In one implementation apparatus (A) may be a smart apparatus with what amounts to a normally open (NO) contact in the electrical line that brings voltage to the vehicle's key switch, the NO contact operable by a processor executing coded instructions from a data repository that may also store data. This smart apparatus in one embodiment might be original equipment integrated into computerized circuitry of the vehicle, and in another embodiment may be an add-in apparatus that may be installed in existing vehicles.

Controlling voltage to the keyed ignition switch is not the only means of controlling whether a vehicle may be started and operated. There are other means described below.

(B) Apparatus (B) comprises computerized apparatus capable of identifying a candidate driver as an authorized driver, and of commanding apparatus (A) to allow the candidate driver to start and operate the vehicle.

Apparatus (B) will comprise in most embodiments input elements whereby a candidate driver may interact with the apparatus, a data repository that may also store coded instructions as well as data, and a processor, such as a microprocessor, that may execute the coded instructions in accordance with inputs from the input elements. The input elements may be physical switches or buttons in some implementations but may be displayed virtual inputs on a touchscreen in other implementations. The invention is taught in several different embodiments.

FIG. 1 illustrates an embodiment in which the necessary features and functions are integrated into the original equipment of a vehicle. Apparatus (A) in this embodiment comprises a computerized subsystem that has a normally open contact 103 in an electrical line that feeds the keyed ignition switch 104 (or equivalent) in a subject vehicle. If normally open contact 103 is open, the vehicle can not be started or operated.

Normally open contact 103 is controlled by microprocessor 101 coupled to a data repository 124. Being a computerized apparatus there is also a date and time clock incorporated, and processor 101 may execute software 127.

Apparatus (B) in this example of an original equipment implementation comprises a second microprocessor 121 coupled to a second data repository 122. The skilled artisan will understand that in this embodiment processors 101 and 121 may actually operate as one processor, but in this description are depicted as two separate processors. The same may be said for the two data repositories. Processor 121 may execute software 128 from repository 122. A battery component 129 is shown as providing power to both apparatus (A) and apparatus (B). This may be a line from the vehicle battery before either contact 103 or keyed switch 104. This may in some instances be a separate battery, and there may be an off/on switch, not shown, that may be used to initiate voltage to both apparatus (A) and apparatus (B). It is necessary that apparatus (A) and apparatus (B) have operating voltage for the electronic components before the vehicle is enabled to start.

In this example data repository 122 stores a list of drivers who are authorized to operate the subject vehicle. The list may comprise just one, or a considerable plurality of authorized drivers. In this example processor 121 may present one or more interactive interfaces on a touchscreen in the dash of the subject vehicle, and there may be virtual inputs on the touchscreen whereby a driver may input data or commands to the system, and the system may display information on the touchscreen for the driver. There may be a biometric input 126, such as, for example, a fingerprint scanner, that may be a part of the touchscreen or may be separate from the touchscreen.

In this example there is a wireless circuit 123 as a part of apparatus (B) enabled to communicate on a cellular network, and to establish communication through a gateway 114 to Internet backbone 113, which represents all of the connectivity and sub-networks of the well-known Internet. Internet connected server 115 executing software 116 and coupled to a data repository 117 represents in this embodiment a server hosted by an enterprise that may interact with apparatus (B) in the subject vehicle. Server 118 represents a plurality of Internet connected servers that may be hosted by private and public enterprises.

In operation in this example the list 112 of drivers who are authorized to operate the subject vehicle may be edited through server 115 by persons operating Internet connected computer platforms through a browser. To do so the person seeking to edit list 112 in any vehicle must be authenticated as a person entitled to do so. Such entitlement may be controlled in a number of ways, such as by members of a family, authorized operatives of an enterprise that may, for example, be responsible for operating a fleet of trucks, taxis or other vehicles, or by perhaps different government entities.

In some embodiment microprocessor 101 may need to know when the vehicle is operating, and when the vehicle stops operating, that is when the driver opens the keyed ignition switch to stop the engine. In some embodiment there may be feedback 130 from the ignition side of the keyed ignition switch that indicates to microprocessor 101 the state of the ignition. This is not in all cases just a conductor as indicated but might be signals of another sort to convey the information of the ignition state.

Figure 2:
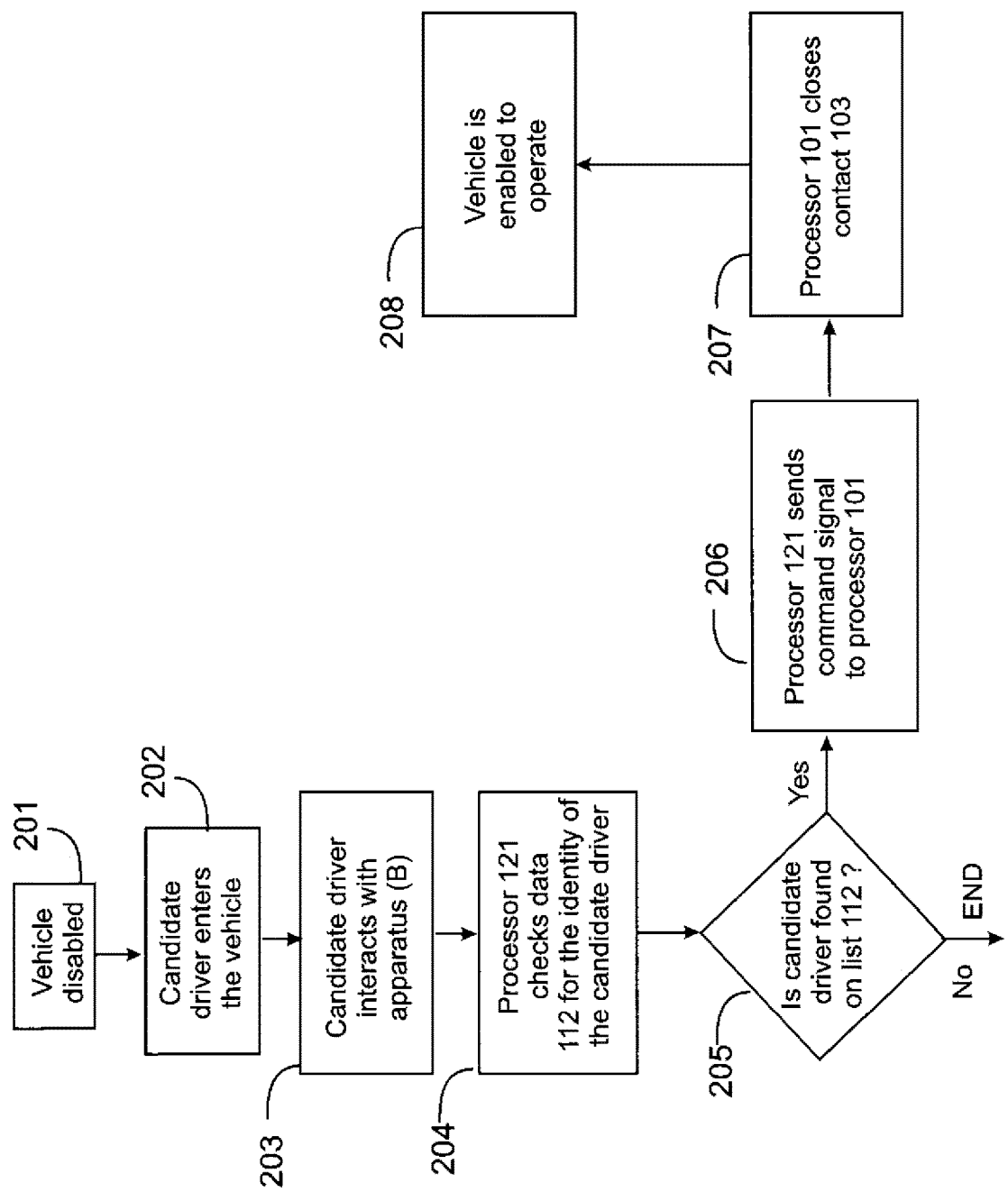
FIG. 2 is a flow diagram illustrating a procedure for starting the subject vehicle of FIG. 1.

FIG. 2 is a flow diagram illustrating a process of a candidate driver entering the subject vehicle of FIG. 1 and endeavoring to start the vehicle. At step 201 the vehicle is disabled. At step 202 the candidate driver enters the vehicle at the driver's position. At step 203 the candidate driver interacts with apparatus (B). If the candidate driver is not an authorized driver of the subject vehicle, he or she may not be aware of any necessity to interact with apparatus (B). In this case, contact 103 will not be closed, and the vehicle will not start, even with a proper keyed interaction with ignition switch 104.

If the candidate drive is an authorized driver, or believes herself to be, she will be aware of the need to interact with apparatus (B). It may be that Apparatus (A) and (B) have operating voltage. In some cases, it will be needed to flip an "on" switch. In some cases, the act of touching biometric input 126 will cause voltage to apply, or touching touchscreen 125 will do so. In any case, it is necessary that the candidate driver identify herself to the system. This may happen through a fingerprint scan at input 126, and a fingerprint scan at touchscreen 125. There may also be some other biometric input, like an iris scan, for example. In one implementation touchscreen 125 may display input fields for a username and a password.

At step 204, after the candidate driver has identified herself through input, processor 121 checks data list 112 for the identity of the candidate driver. If, at step 205, the candidate driver is not found on the list, the process ends, and the vehicle cannot be started. If, at step 205, the candidate driver is found on the list, at step 206 processor 121 sends a command signal to processor 101 to close contact 103. Now the vehicle may be started with keyed switch 104.

In one embodiment processor 101 senses when keyed ignition switch 104 opens, that is, when the driver elects to turn off the ignition. In response processor 101 also opens contact 103, requiring that the process of FIG. 2 be repeated for the car to be started again. In the circumstance that the driver is identified by a biometric input, the process is very quick, and not a burden.

The inventors recognize that there may be instances where an authorized driver may want to loan the vehicle to another, or they may be some urgent need for a driver other than an authorized driver to start and operate the vehicle. In one embodiment there may be an interactive interface displayed on touchscreen display 125 through which an authorized driver may close contact 103 for a selected period of time, such as, for example, 24 hours, allowing an unauthorized driver to start and operate the vehicle during that time period. In another circumstance there may be inputs in an interactive interface by which an authorized driver may elect to keep contact 103 closed for an elected period of time each time that the process to close contact 103 is successfully completed.

Referring now to Internet connected server 115 and recalling that the system according to FIGS. 1 and 2 is a system integrated into the vehicle's computer circuitry in manufacture, there may be a variety of ways that services may be provided by software 116 executing at server 115. In one embodiment data repository 112 may store an identity of the subject vehicle such that communication between server 115 and the subject vehicle may only be enabled if the ID is known to server 115. Under this circumstance, if a person were to purchase a vehicle operating according to an embodiment of this invention as an original equipment embodiment, the purchaser might register with server 115, verify ownership of the vehicle, perhaps by cooperation of the manufacturer or seller of the vehicle, the identification for that vehicle may be entered to enable communication between server 115 and the subject vehicle through wireless circuitry 123. One service might be ability, as described briefly above, to edit the list of authorized drivers for the subject vehicle. The identification for the vehicle might be a digital version of the well-known VIN for the vehicle.

Figure 3:
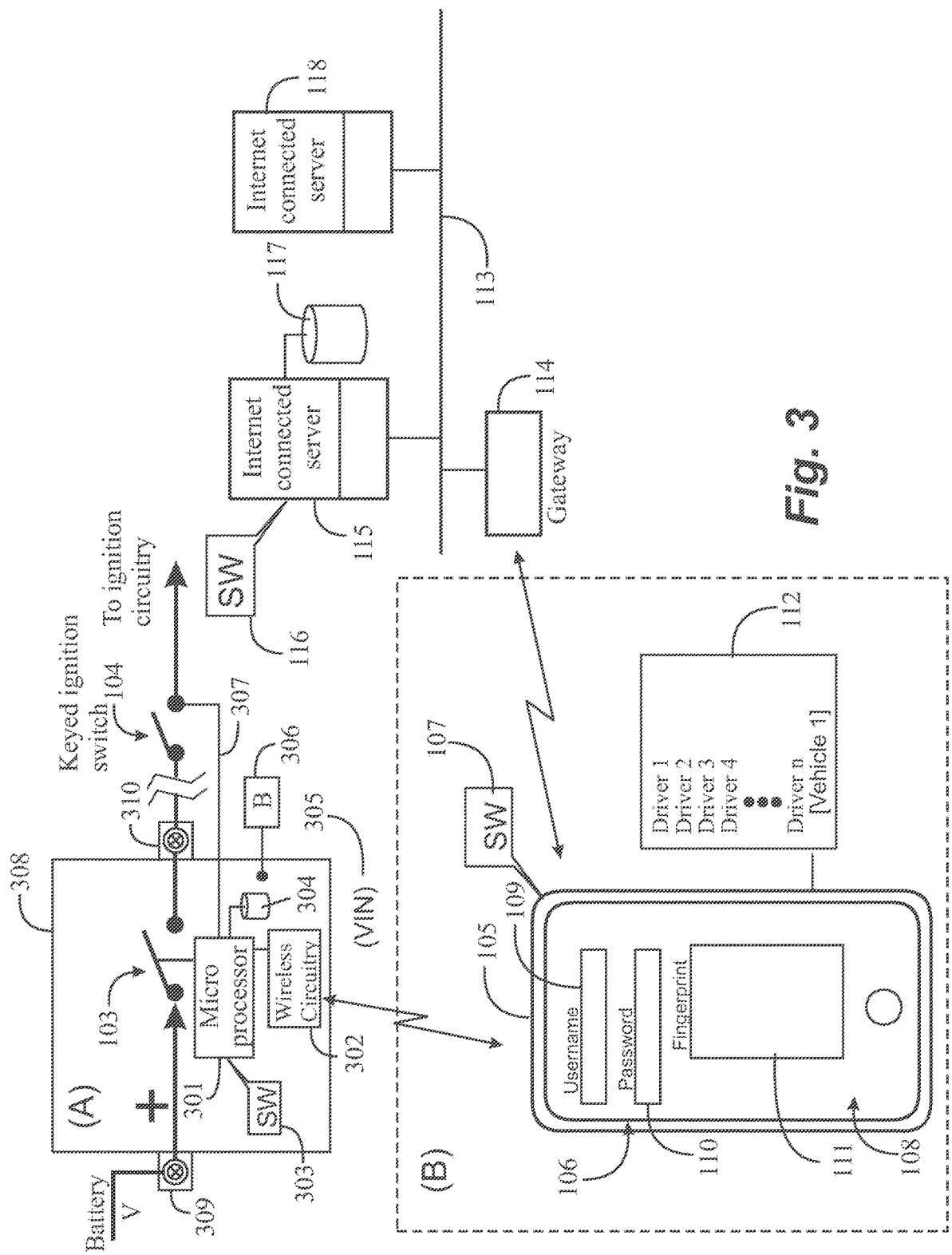
FIG. 3 is diagram illustrating a system in an alternative embodiment of the present invention.

FIG. 3 is a diagram depicting an embodiment of the present invention especially suited for an aftermarket situation. This is a system that may be installed in just about any existing vehicle that has a keyed start switch 104, which may be an ignition switch. Apparatus (A) in this example is a unit that has an input terminal 309 and an output terminal 310 such that the unit may be connected to battery voltage on one side and to input for the keyed switch 104 on the other side. Apparatus (A) thus becomes a condition for positive battery voltage to be connected to the keyed switch.

Apparatus (A) in this example comprises a microprocessor 301 coupled to a data repository 304 and executing software (SW) 303. The microprocessor is also connected to a wireless communication circuitry 304, that is enabled to pair to remote but nearby devices, such as Bluetooth™ devices. Bluetooth™ however is not a limitation, as there are several other near field systems that might be used.

A battery component 306 is shown as providing power to apparatus (A). This may be a separate battery for the purpose, perhaps rechargeable, or may a line from the vehicle battery before either contact 103 or keyed switch 104. It is necessary that apparatus (A) has operating voltage for the electronic components.

In one embodiment apparatus (A) may be a unit enclosed in a protected casing 308, enabled to be attached to a vehicle firewall or any other accessible surface, and then connected to battery voltage and to the keyed switch, which should then not be connected to another input, so apparatus (A) is the only input to the keyed switch.

Apparatus (B) in this example is provided by a smartphone 105 (or other mobile device, such a pad device, having a touchscreen display 106 and a data repository 112. In this embodiment the smartphone has a processor, not shown, executing software 107, which may include an application specific to this invention, providing interactive interfaces on touchscreen display 106, one of which may be interface 108 illustrated. In this embodiment smartphone 105 communicates on a cellular network, and may couple to the Internet network, represented by backbone 113, through a gateway 114.

Data repository 112, coupled to the processor in the smartphone, stores one or more lists of authorized drivers, here indicated by Driver 1 through Driver n, associated with a particular vehicle, listed her as vehicle 1. It should be understood that the driver listings in the data repository may not be for just one specific vehicle but may be recorded and stored for a plurality of vehicles, and each specific vehicle may have one or more than one authorized driver.

With apparatus (A) in place and connected in a vehicle as shown, a candidate driver may enter the vehicle at the driver's position to start and operate the vehicle. In this example, if the candidate driver does not have a smartphone executing the specific application required, that driver cannot start the vehicle, because contact 103 is normally open, and cannot be closed to enable keyed switch 104 unless a certain procedure takes place with smartphone 105. It may be assumed that candidate drivers who are properly authorized to start and operate the specific vehicle shown will be aware that the smartphone executing the app is necessary.

When the candidate driver enters the vehicle at the driver's position the near-field wireless system of the smartphone will pair with wireless apparatus 302 automatically, if it has been previously paired and set for automatic pairing. Otherwise the candidate will have to initiate pairing through the settings facility of the smartphone, after which the pairing may be automatic going forward.

Pairing by smartphone 105 with wireless apparatus 302 is necessary, but not sufficient to close contact 103. The app that presents interactive interface 108 must be executing. But the app executing is also not a sufficient condition. The candidate driver also must be logged into the app., which he or she may do through interactive interface 108, by, for example, entering the correct username in field 109 and password in field 110. Alternatively, there may be a biometric input like fingerprint scanner 111 or an equivalent authentication scheme.

With a candidate driver in place, the smartphone paired with apparatus 302, and the candidate logged into the executing application, processor 301 executing SW 303 causes a vehicle identification 305 to be communicated to the smartphone app. This will be a digital value unique to the specific vehicle and may be a digital representation of the well-known vehicle identification number (VIN). This may be accomplished in different ways. The VIN may just be broadcast as long as apparatus (A) is powered or may be broadcast momentarily in response to a query from smartphone 105 running the application. In any case, upon receiving the VIN, and being aware of the identity of the driver logged into the application, the application checks the list 112 of authorized drivers in the data repository for the specific vehicle having the received VIN. If the candidate driver is on the list, the app communicates a specific command to processor 301 in apparatus (A) through wireless apparatus 302, and in response, processor 301 closes contact 103, enabling the candidate driver to operate keyed switch 104 and start the vehicle.

In some embodiments, as described above microprocessor 301 may need to know when the vehicle is operating, and when the vehicle stops operating, that is, when the driver opens the keyed ignition switch to stop the engine. In some embodiment there may be feedback 307 from the ignition side of the keyed ignition switch that indicates to microprocessor 101 the state of the ignition. This is not in all cases just a conductor as indicated but might be signals of another sort to convey the information of the ignition state.

As described for the original equipment embodiment above, processor 301 may close contact 103 for a selected time period, and there may be configuration interfaces enabling the authorized driver to configure different operating programs for apparatus (A) to account for a need for such as valet parking, loaning the vehicle to trusted drivers, and other situations.

Figure 4:
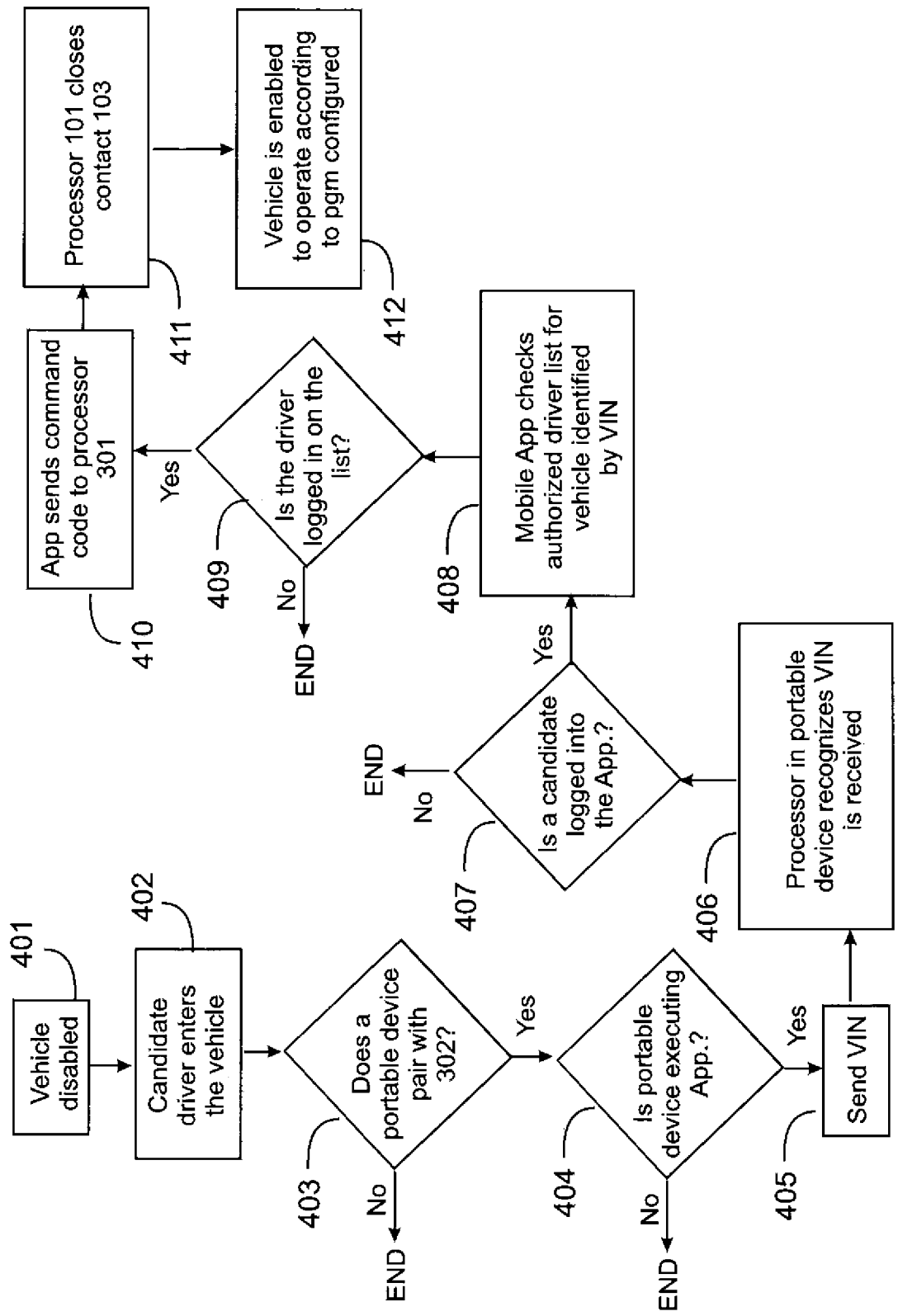
FIG. 4 is a flow diagram depicting steps in operation of the system of FIG. 3.

FIG. 4 is a flow diagram illustrating steps in a process for enabling the specific vehicle in FIG. 3 to be started and operated. At step 401 the vehicle is disabled, with contact 103 open. At step 402 a candidate driver enters the vehicle at the driver's position. At step 403 processor 301 determines if a portable device pairs with wireless apparatus 302. If not, the process ends. If Yes, control goes to step 404, where it is determined whether the portable device is executing a specific application unique to the invention. If No, the process ends. If Yes, control goes to step 405, and processor 301 causes the stored VIN for the vehicle to be communicated to the App being executed by the portable device. At step 406 the App. recognizes that the VIN is received.

At step 407 it is determined whether a candidate is logged into the App. If not, the process ends. If Yes, control goes to step 408. At step 408 the App. checks the authorized driver list stored for the specific vehicle identified by the VIN. At step 409 it is determined whether the candidate driver logged into the App. is on the list. If not, the process ends. If Yes, control advances to step 410, and the App. sends a command code to processor 301 by way of wireless apparatus 302. Processor 301 closes contact 103 in response at step 411. At step 412 the specific vehicle is enabled to operate according to whatever program may have been configured.

In one embodiment of the invention, rather than a cellular telephone, which is a convenience, an authorized driver might have a dongle, the dongle having an input for identification, such as a fingerprint, and short-range wireless circuitry to pair with control unit 101. The dongle in this case would be enabled to receive the ID number, to check authorization, and to send the correct command input to processor 301 to cause the switch 103 to close. In this example, the dongle provides a two-factor authentication, being something the driver possesses and something the driver is.

As briefly described above, there may be a web presence integrated with systems according to embodiments of the invention. Internet backbone 113 is illustrated to represent all the connections, networks and interconnections in the Internet network. A gateway 114 is illustrated as connected to Internet 113 and in wireless communication with mobile device 105. A server 115 is shown connected to the Internet and executing software (SW) 116. Server 115 is coupled to a data repository 117. A third-party server 118 is illustrated as also connected to the Internet.

In one embodiment of the invention server 115 provides a web site to which persons may register to participate in services provided relative to a system to enable persons to operate vehicles that may be equipped to operate according to embodiments of the invention. Users may register in the system provided by server 115 as is well-known in the art, such as by creating a Username and a Password. Registered persons may log in and avail themselves of services provided.

One service provided by server 115 may enable persons to set up a family cooperative unit wherein family members may confer and decide on driving privileges for specific vehicles that may be personal property of and may be registered to different members sf the family group. In this service vehicle ID numbers and authorized drivers may be associated, and this information may be communicated to individual mobile apps used by the family members. As authorizations change, server 115 may communicate changes to apparatus such as smartphones of candidate drivers, and in some instances a candidate driver may discover he or she can no longer operate a certain vehicle.

The inventors in the present case are aware that implementation of some embodiments of the invention and their use might have some legal ramifications. For example, one motivation for this invention is a need for a way to deal with the social and family problem of senior citizens gradually losing the physical and cognitive abilities to safely drive in public places. It is known that this is typically a very gradual evolution, and there is no definitive standard to say one particular person has passed from being a safe driver to being a driver putting himself and others at an unacceptable risk.

Many families go through the process of trying to deal with an older father or grandfather, for example, who has had an increasing problem, resulting in fender-benders, narrow escapes, tickets for reckless driving, and so forth. It is an exceptional person who has a clear realization that he or she has reached a point that everyone would be safer if that person no longer drove. It is more often the case that the subject has a blind spot, and a level of denial. No one looks forward to the suspension or removal of driving privileges. Privacy issues and the like, however, are not technical issues, and have no bearing on patentability. The family group enabled as described above, to act in concert to authorize drivers of shared family vehicles, may certainly control a family member's ability to operate a vehicle, if that vehicle is equipped according to an embodiment of this invention.

Anti-Theft Issues

The system in embodiments of the present invention has further advantages, it seems. For example, a vehicle equipped with a control unit according to the invention may be more difficult to steal. Many ways that vehicles are stolen by jumping the keyed ignition switch are now ineffective, because jumping the keyed ignition switch will not start the vehicle. Vehicles with electric motors may also be equipped with systems according to this invention, as long as there is a keyed switch to start the vehicle and operate the electric motors.

Truck and Auto fleets

Managers of trucking firms, taxi companies and other enterprises having fleets of vehicles that may be operated by employees of the enterprise may equip their vehicles with systems according to embodiments of this invention, and effectively control which employees are enabled to operate which vehicles.

Insurance Companies

Insurance providers may certainly prorate cost of insurance depending on existence of systems according to embodiments of the invention in vehicles insured and use by the insured.

A skilled person will understand that the examples and embodiments described are entirely exemplary, and not limiting to the scope of the invention. The functionality described for elements of the invention, and for systems of elements, may be accomplished in a variety of ways. For example, controlling voltage to the keyed ignition switch is not the only means of controlling whether a vehicle may be started and operated. The voltage can also be disrupted (low voltage) in areas other than the keyed ignition switch to control starting the vehicle. Some of these areas are: The engine control unit, a park/neutral switch, a fuel pump, starter control, security system, crank angle/position, and others. These will not disrupt the major power systems of the car—alarm, clock settings, etc. The invention in some embodiments may be enabled by placing a connection/relay/switch/fuse (turn on/off) between two critical none-dangerous connections and intercepting the current to the sensor that won't allow a car to start.

The invention is limited only by the scope of the claims.

We claim:

1. A system enabling a candidate driver to start and operate a vehicle, comprising:
   a first electronic apparatus comprising:
      a protected casing enabled to be attached to a vehicle firewall or other accessible surface, the protected casing having an input terminal connected to positive battery voltage of the vehicle, and an output terminal connected to a keyed ignition switch of the vehicle;
      a first microprocessor within the protected casing executing first coded instructions from a non-transitory medium;
      a first data repository coupled to the first microprocessor;
      a normally open electrical contact in a conductor path between the input terminal and the output terminal, the normally open electrical contact controlled by the first microprocessor, such that the vehicle cannot be started and operated with the normally open electrical contact open;
      wireless communication circuitry coupled to the first microprocessor; and
      feedback to the first microprocessor indicating whether the ignition switch is open or closed;
   a smartphone or an electronic pad device comprising:
      a second microprocessor executing a proprietary application, the second microprocessor coupled by second wireless communication circuitry with the wireless communication circuitry of the first microprocessor;
      a second data repository coupled to the second microprocessor and storing a list of identities of drivers authorized to operate the vehicle;
      a touchscreen display;
      first input mechanisms displayed on the touchscreen display enabling the candidate driver to identify to the second microprocessor, wherein, if the candidate driver is in the list of identities of drivers authorized to operate the vehicle, the second microprocessor instructs the first microprocessor to close the normally open contact and to keep the normally open contact closed until the feedback to the first microprocessor indicating whether the ignition switch is open or closed, indicates that the ignition switch has been opened; and
      second input mechanisms displayed on the touchscreen display enabling the candidate driver, having been identified as authorized to operate the vehicle, to cause the normally open contact to close and remain closed for a selected period of time.

2. The system of claim 1 wherein the feedback to the first microprocessor indicating whether the ignition switch is open or closed comprises an electrical contact in an ignition circuit after the keyed ignition switch, connected by an electrical conductor back to the first microprocessor, enabling the first microprocessor to sense when the keyed ignition switch is open or closed by presence or absence of voltage on the electrical conductor.

3. The system of claim 1 wherein the first data repository coupled to the first microprocessor stores a unique vehicle identifier for the vehicle to which the first electronic apparatus is mounted, and the second data repository in the smartphone or pad device used by the candidate driver stores a plurality of lists of identities of candidate drivers authorized to operate a vehicle, each list associated with a different vehicle identifier, and wherein, upon the proprietary application being active, and the candidate driver logging into the proprietary application, the first microprocessor broadcasts the unique vehicle identifier stored in the first data repository to the smartphone or pad device, and the proprietary application checks only the list of candidate drivers associated with the broadcast vehicle identifier to determine if the candidate driver is authorized to operate the vehicle, thus enabling candidate drivers to potentially operate any one of a plurality of vehicles.

4. The system of claim 1 wherein the smartphone or electronic pad device connects to the well-known Internet network through a cellular network serving the smartphone or electronic pad device.

5. The system of claim 4 further comprising an Internet connected server hosted by an enterprise, the Internet-connected server executing coded instructions implementing a web site providing a plurality of services, a first service enabling a person operating an Internet connected device to connect to the web site using the smartphone or pad device and to register as a member of the enterprise through an interactive interface provided on a display of the smartphone or pad device, and to create a user identity to log in to the web site.

6. The system of claim 5 wherein a second service is provided enabling registered members to create and edit lists of candidate drivers authorized to drive specific vehicles and to store the lists in a data repository, and wherein the second microprocessor in the smartphone or pad device downloads lists associated with the specific vehicles.

7. The system of claim 5 wherein a third service enables one or both of representatives of insurance companies and law enforcement organizations to register as members, and to edit lists of candidate drivers authorized to operate specific vehicles.

8. A method enabling a candidate driver to start and operate a vehicle, comprising:
   implementing a first electronic apparatus having first wireless communication circuitry and a microprocessor coupled to a data repository in a protective casing having terminals outside the protective casing, and implementing a normally open contact in a conductor path between the terminals within the protective casing, with the microprocessor coupled to and enabled to open and close the normally open contact;

mounting the protective casing to a surface in the vehicle;

connecting one terminal to battery voltage and the other to voltage input of a keyed ignition switch of the vehicle as the only input to the keyed ignition switch;

implementing a feedback to the first microprocessor from a point in ignition circuitry of the vehicle indicating the ignition switch is open or closed;

pairing the first wireless communication circuitry with second wireless communication circuitry of a second electronic apparatus being a smartphone or a pad device executing a proprietary mobile application by a second microprocessor;

logging into the mobile application by the candidate driver via first input mechanisms displayed on a touchscreen of the smartphone or pad device;

checking by the mobile application a list of candidate drivers authorized to operate the vehicle, the list stored in the second data repository, and, if the candidate driver is in the list, signaling the first microprocessor by the second microprocessor via the paired wireless communication circuitry, to close the normally open contact, providing voltage to the input of the keyed ignition switch;

providing second input mechanisms displayed on the touchscreen of the smartphone or pad device enabling the candidate driver to select a time period for the normally open contact to remain closed; and if the candidate driver has selected a time period for the normally open contact to remain closed, opening the normally open contact by the first microprocessor when the time period expires, and if the candidate driver has not selected a time period, opening the normally open contact by the first microprocessor upon the first microprocessor receiving the feedback that the keyed ignition switch is open.

9. The method of claim 8 wherein the feedback to the first microprocessor indicating whether the ignition switch is open or closed comprises an electrical contact in an ignition circuit after the keyed ignition switch, connected by an electrical conductor back to the first microprocessor, the method comprising a step of the first microprocessor sensing a voltage on the electrical conductor.

10. The method of claim 8 wherein the first data repository coupled to the first microprocessor stores a unique vehicle identifier for the vehicle to which the first electronic apparatus is mounted, and the second data repository in the smartphone or pad device used by the candidate driver stores a plurality of lists of identities of candidate drivers authorized to operate a vehicle, each list associated with a different vehicle identifier, the method comprising, upon the proprietary application being active, and the candidate driver logging into the proprietary application, the first microprocessor broadcasting the unique vehicle identifier stored in the first data repository to the smartphone or pad device, and the proprietary application checking only the list of candidate drivers associated with the broadcast vehicle identifier to determine if the candidate driver is authorized to operate the vehicle, thus enabling candidate drivers to potentially operate any one of a plurality of vehicles.

11. The method of claim 8 comprising a step of the smartphone or electronic pad device connecting to the well-known Internet network through a cellular network serving the smartphone or electronic pad device.

12. The method of claim 11 further comprising a step of the smartphone or electronic pad device connecting to an Internet connected server hosted by an enterprise, the Internet-connected server executing coded instructions implementing a web site providing a plurality of services, a first service enabling a person operating an Internet connected device to connect to the web site using the smartphone or pad device and to register as a member of the enterprise through an interactive interface provided on a display of the smartphone or pad device, and to create a user identity to log in to the web site.

13. The method of claim 12 comprising the Internet-connected server providing a second service enabling registered members to create and edit lists of candidate drivers authorized to drive specific vehicles and to store the lists in a data repository, and the second microprocessor in the smartphone or pad device downloading lists associated with the specific vehicles.

14. The method of claim 12 comprising the Internet-connected server providing a third service enabling one or both of representatives of insurance companies and law enforcement organizations to register as members, and to edit lists of candidate drivers authorized to operate specific vehicles.

* * * * *